United States Patent
Popat et al.

(10) Patent No.: US 8,233,726 B1
(45) Date of Patent: Jul. 31, 2012

(54) IMAGE-DOMAIN SCRIPT AND LANGUAGE IDENTIFICATION

(75) Inventors: Ashok Popat, Menlo Park, CA (US); Eugene Brevdo, Pinceton, NJ (US)

(73) Assignee: Googe Inc., Mountain View, CA (US)

(*) Notice: Subject to any disclaimer, the term of this patent is extended or adjusted under 35 U.S.C. 154(b) by 1281 days.

(21) Appl. No.: 11/945,978

(22) Filed: Nov. 27, 2007

(51) Int. Cl.
*G06K 9/72* (2006.01)
*G06K 9/38* (2006.01)

(52) U.S. Cl. ......... 382/230; 382/177; 382/187; 382/224

(58) Field of Classification Search .................. 382/177, 382/182–189, 224–228, 321, 229, 230
See application file for complete search history.

(56) References Cited

U.S. PATENT DOCUMENTS

| | | | | |
|---|---|---|---|---|
| 5,062,143 A | * | 10/1991 | Schmitt | 382/230 |
| 5,276,741 A | * | 1/1994 | Aragon | 382/229 |
| 5,982,933 A | * | 11/1999 | Yoshii et al. | 382/226 |
| 5,991,714 A | * | 11/1999 | Shaner | 704/9 |
| 6,005,986 A | * | 12/1999 | Ratner | 382/288 |
| 6,047,251 A | * | 4/2000 | Pon et al. | 704/1 |
| 6,064,767 A | * | 5/2000 | Muir et al. | 382/190 |
| 6,157,905 A | * | 12/2000 | Powell | 704/2 |
| 6,246,976 B1 | * | 6/2001 | Mukaigawa et al. | 704/9 |
| 6,272,242 B1 | * | 8/2001 | Saitoh et al. | 382/187 |
| 6,272,456 B1 | * | 8/2001 | de Campos | 704/8 |
| 6,658,151 B2 | * | 12/2003 | Lee et al. | 382/229 |
| 6,704,698 B1 | * | 3/2004 | Paulsen et al. | 704/1 |
| 7,020,338 B1 | | 3/2006 | Cumbee | |
| 7,689,409 B2 | * | 3/2010 | Heinecke | 704/9 |
| 7,877,258 B1 | * | 1/2011 | Chelba et al. | 704/257 |
| 2002/0150300 A1 | * | 10/2002 | Lee et al. | 382/229 |
| 2004/0042667 A1 | * | 3/2004 | Lee et al. | 382/230 |
| 2008/0091424 A1 | * | 4/2008 | He et al. | 704/240 |

OTHER PUBLICATIONS

Issam Bazzi et al, *Omnifront and Unlimited-Vocabulary OCR for English and Arabic*, Proceedings of the Fourth International Conference on Document Analysis and Recognition, Aug. 18-20, 1997, pp. 842-846, vol. II.

Judith Hochberg et al, *Automatic Script Identification from Document Images Using Cluster-Based Templates*, IEEE Transactions on Pattern Analysis and Machine Intelligence, Feb. 1997, pp. 176-181, vol. 19, No. 2.

A. Lawrence Spitz, *Determination of the Script and Language Content of Document Images*, IEEE Transactions on Pattern Analysis and Machine Intelligence, Mar. 1997, pp. 235-245, vol. 19, No. 3.

* cited by examiner

*Primary Examiner* — Aaron W Carter
(74) *Attorney, Agent, or Firm* — Fenwick & West LLP

(57) ABSTRACT

Disclosed herein is a method, computer system and computer program product for identifying a writing system associated with a document image containing one or more words written in the writing system. Initially, a document image fragment is identified based on the document image, wherein the document image fragment contains one or more pixels from one or more of the words in the document image. A set of sequential features associated with the document image fragment is generated, wherein each sequential feature describes one dimensional graphic information derived from the one or more pixels in the document image fragment. A classification score for the document image fragment is generated responsive at least in part to the set of sequential features, the classification score indicating a likelihood that the document image fragment is written in the writing system. The writing system associated with the document image is identified based at least in part on the classification score for the document image fragment.

28 Claims, 7 Drawing Sheets

IMAGE-DOMAIN SCRIPT AND LANGUAGE IDENTIFICATION

BACKGROUND OF THE INVENTION

1. Field of the Invention

This invention pertains in general to language identification for optical character recognition (OCR).

2. Description of the Related Art

Optical character recognition (OCR) is a technology widely used to transform document images into computer readable text. In order to perform OCR, a dictionary or "language pack" which indicates the writing system for the OCR Engine to use must be specified to enable character recognition. A writing system consists of a set of character symbols and grammatical rules. Writing systems are generally associated with languages, with some languages having more than one writing system. For instance, the Japanese language can be written using the writing systems of Kanji, Hirigana and Katakana. Related writing systems such as English, German and French generally use the same character symbols but differ in lexicon and language structure. Other writing systems such as Hirigana and Katakana use the same grammatical structure with two different sets of symbols.

The quality of output from OCR is highly dependent on the selection of the correct dictionary. Therefore, the ability to identify the writing system a document is written in based on a document image in order to select a dictionary for performing OCR is necessary for automating the application of OCR technology. The simplest method of writing system based on a document image entails applying OCR to the document image using all possible dictionaries and determining the cross entropy of the document text obtained through OCR with a language model. Given that this method requires OCR and validation to be performed using a large number of writing system dictionaries, this method is very computationally expensive. Accordingly, performing OCR selectively with dictionaries specifying writing systems with high likelihood of occurrence (e.g. English) and sampling of document images are two techniques often used to reduce the computational expense of methods which use OCR as a first step. However, both of these techniques compromise the accuracy of this method.

Alternative techniques for writing system identification use image analysis to determine the language of a document before using OCR. These techniques use two dimensional image features to determine characters in an image document. While two-dimensional images features can be used to accurately identify characters, these features are independent of local context reflecting grammatical rules and computationally expensive to generate and compare.

BRIEF SUMMARY OF THE INVENTION

The above and other difficulties are overcome by a method, system, and computer program product for identifying a writing system associated with a document image containing one or more words written in the writing system.

One aspect provides a computer-implemented method of identifying a writing system associated with a document image containing one or more words written in the writing system. Initially, a document image fragment is identified based on the document image, wherein the document image fragment contains one or more pixels from one or more of the words in the document image. A set of sequential features associated with the document image fragment is generated, wherein each sequential feature describes one dimensional graphic information derived from the one or more pixels in the document image fragment. A classification score for the document image fragment is generated responsive at least in part to the set of sequential features, the classification score indicating a likelihood that the document image fragment is written in the writing system. The writing system associated with the document image is identified based at least in part on the classification score for the document image fragment.

In another aspect, the described embodiments provide a computer system for identifying a writing system associated with a document image containing one or more words written in the writing system. The system comprises a segmentation module adapted to identify a document image fragment based on the document image, wherein the document image fragment contains one or more pixels from one or more of the words in the document image. The system further comprises a feature extraction module adapted to generate a set of sequential features associated with the document image fragment, wherein each sequential feature describes one dimensional graphic information derived from the one or more pixels in the document image fragment. The system further comprises a feature classification module adapted to generate a classification score for the document image fragment responsive at least in part to the set of sequential features, the classification score indicating a likelihood that the document image fragment is written in the writing system. The system further comprises an optical character recognition module adapted to identify the writing system associated with the document image based at least in part on the classification score for the document image fragment.

Another aspect is embodied as a computer-readable storage medium on which is encoded computer program code for identifying a writing system associated with a document image containing one or more words written in the writing system according to the above described method.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

I. Overview

Figure 1:
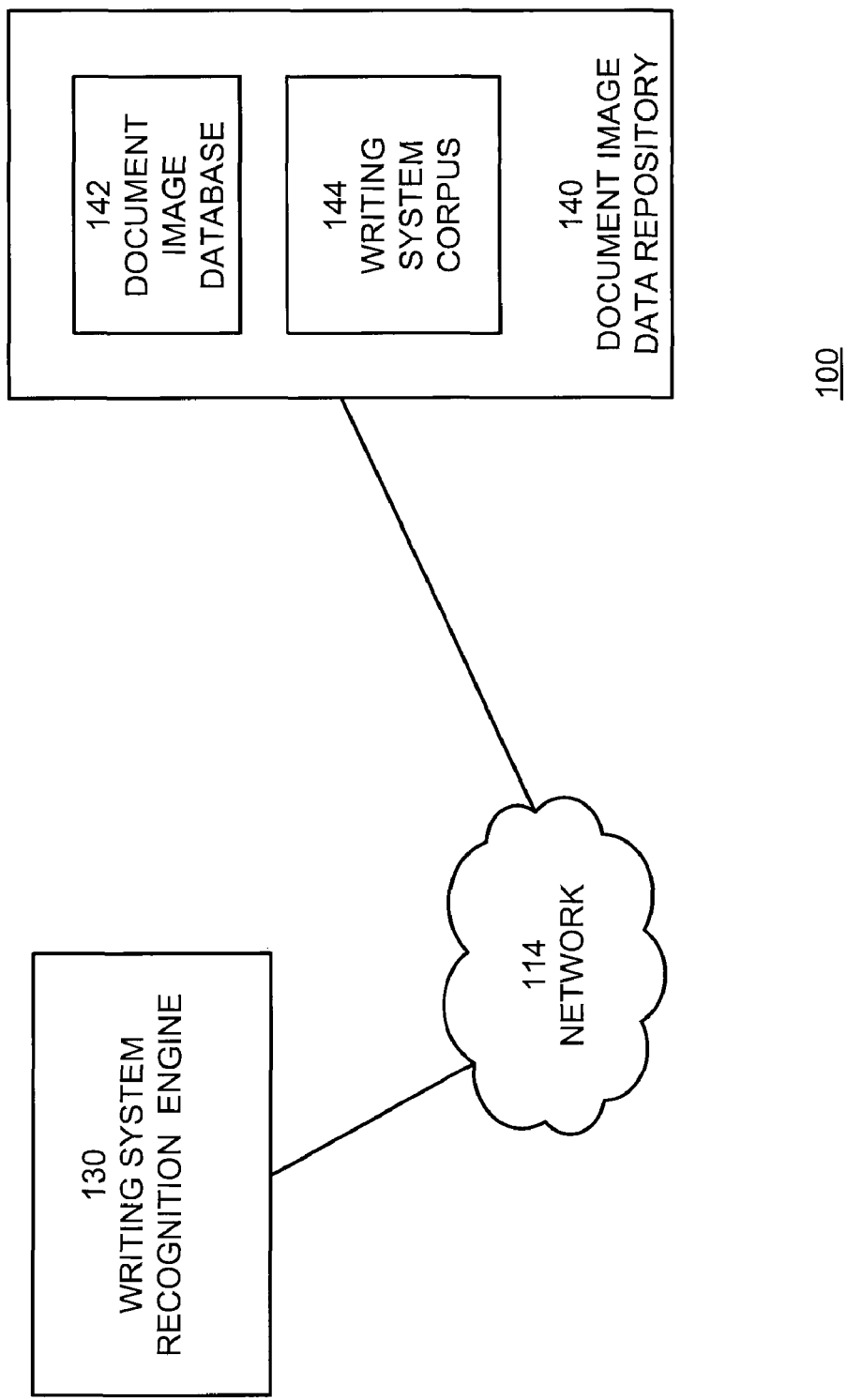
FIG. 1 is a high-level block diagram of a computing environment according to one embodiment of the present invention.

FIG. 1 is a high-level block diagram of a computing environment 100 according to one embodiment. FIG. 1 illustrates a Document Image Data Repository 140 and Writing System Recognition Engine 130 connected to a Network 114. Although FIG. 1 illustrates the Writing System Recognition Engine 130 as a single engine, in some embodiments the Writing System Recognition Engine 130 can have multiple engines. Likewise, there can be multiple Document Image Data Repositories 140 on the Network 114. Only one of each entity is illustrated in order to simplify and clarify the present description. There can be other entities on the Network 114 as well. In some embodiments, the Writing System Recognition Engine 130 and Document Image Data Repository 140 are combined into a single entity.

The Writing System Recognition Engine 130 supports writing system and optical character recognition based on document images. A writing system, as defined herein, refers to a set of characters and grammatical rules used to write a script or a language. The Writing System Recognition Engine 130 processes document images to identify associated writing systems. The Writing System Recognition Engine 130 uses the identified writing systems to determine a dictionary associated with the writing system for performing OCR on the document images. The Writing System Recognition Engine 130 also processes document images associated with writing systems to generate a Writing System Corpus 144 used to identify writing systems associated with document images.

The Document Image Data Repository 140 stores a Document Image Database 142 and Writing System Corpus 144. The Document Image Database 142 stores document images with unknown writing systems and information generated from these document images that is used to identify the writing systems associated with the document images. The Writing System Corpus 144 stores document images labeled with known writing systems and information generated from these document images labeled with known writing systems that is used by the Writing System Recognition Engine 130 to classify documents in the Document Image Database 142.

The Network 114 represents the communication pathways among the Writing System Recognition Engine 130, the Document Image Data Repository 140, and any other entities connected to the Network 114. In one embodiment, the Network 114 is the Internet. The Network 114 can also utilize dedicated or private communications links that are not necessarily part of the Internet. In one embodiment, the Network 114 uses standard communications technologies and/or protocols. Thus, the Network 114 can include links using technologies such as Ethernet, 802.11, integrated services digital network (ISDN), digital subscriber line (DSL), asynchronous transfer mode (ATM), etc. Similarly, the networking protocols used on the Network 114 can include multiprotocol label switching (MPLS), the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the Network 114 can be represented using technologies and/or formats including the HTML, the extensible markup language (XML), the Extensible Hypertext markup Language (XHTML), the compact HTML (cHTML), etc. In addition, all or some of links can be encrypted using conventional encryption technologies such as the secure sockets layer (SSL), HTTP over SSL (HTTPS), and/or virtual private networks (VPNs). In other embodiments, the Writing System Recognition Engine 110 and Document Image Data Repository 140 use custom and/or dedicated data communications technologies instead of, or in addition to, the ones described above.

Figure 2:
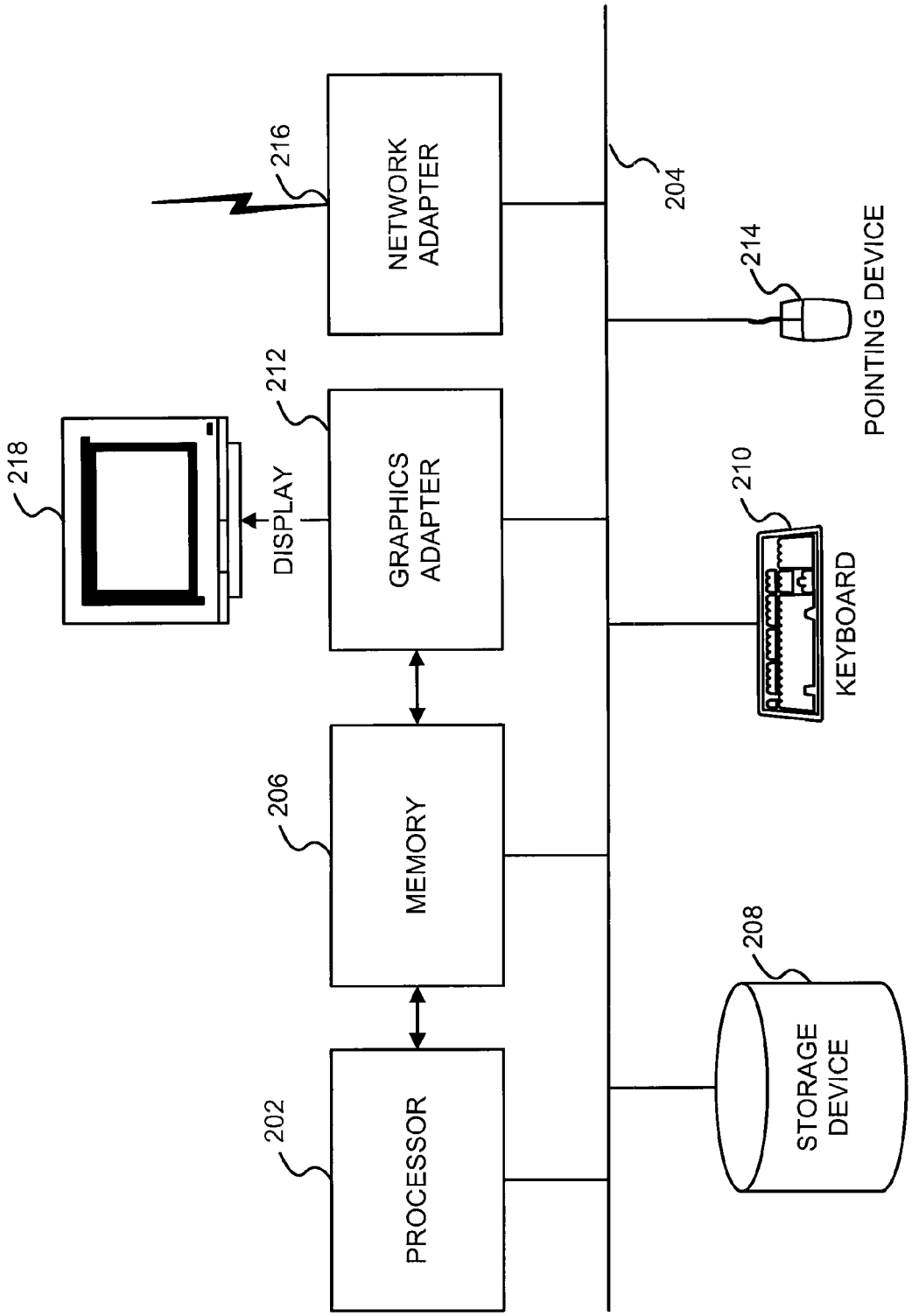
FIG. 2 is a high-level block diagram illustrating a functional view of a typical computer for use as the Writing System Recognition Engine 130 and/or Document Image Data Repository 140 illustrated in the environment of FIG. 1 according to one embodiment.

FIG. 2 is a high-level block diagram illustrating a functional view of a typical computer 200 for use as the Writing System Recognition Engine 130 and/or Document Image Data Repository 140 illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer 200 to the Network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 used by the entities of FIG. 1 can vary depending upon the embodiment and the processing power required by the entity. The Writing System Recognition Engine 130 can include one or more distributed physical or logical computers operating together to provide the functionalities described herein. Likewise, the data repository can be provided by a storage area network (SAN), database management system (DBMS), or another storage system. The computers 200 can lack some of the components described above, such as keyboards 210, graphics adapters 212, and displays 218.

Figure 3:
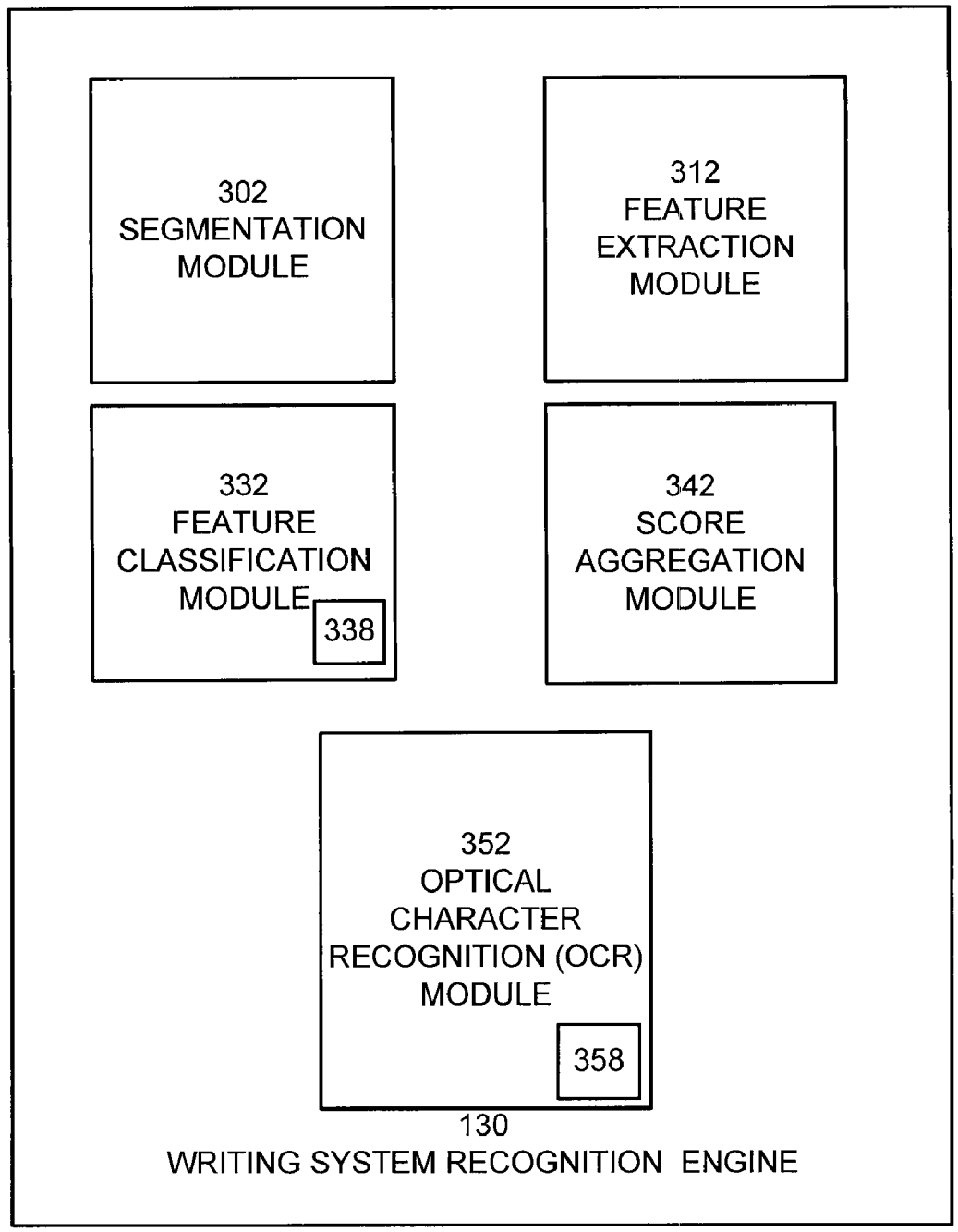
FIG. 3 is a high-level block diagram illustrating modules within the Writing System Recognition Engine 130 according to one embodiment.

FIG. 3 is a high-level block diagram illustrating modules within the Writing System Recognition Engine 130 according to one embodiment.

A Segmentation Module 302 identifies document image fragments corresponding to words. Document image fragments are identified from document images stored in the Document Image Database 142 and Writing System Corpus 144. The Segmentation Module 302 further stores the document image fragments in the Document Image Database 142 and Writing System Corpus 144. In one embodiment, the Segmentation Module 502 runs as a batch program whenever new document images are added to the Document Image Database 142 or the Writing System Corpus 144.

The Feature Extraction Module 312 generates feature vectors of sequential one-dimensional image features based on the document image fragments in the Document Image Database 142 or the Writing System Corpus 144. In one embodiment, the Feature Extraction Module 312 identifies an ordered set of connected components in each document image fragment corresponding to characters in a writing system and generates sequential one-dimensional features based on the connected components. In other embodiments, the Feature Extraction Module 312 identifies an ordered set of pixel column frames which are used to generate sequential one-dimensional image features. The Feature Extraction Module 312 stores the feature vectors of sequential one-dimensional image features in the Document Image Database 142 or the Writing System Corpus 144. In one embodiment, the Feature Extraction Module 312 runs as a batch program whenever new document image fragments are added to the Document Image Database 142 or the Writing System Corpus 144.

The Feature Classification Module 332 generates a set of classification scores each of which indicates the likelihood that a document image fragment is written using a writing system of a set of writing systems. The Feature Classification Module 322 uses the set of feature vectors in the Writing System Corpus 144 to generate classification scores for feature vectors associated with a document image fragments in the Document Image Database 142. In some embodiments, the Feature Classification Module 322 generates a probabilistic model 338 based on feature vectors associated with document image fragments in the Writing System Corpus 144 and applies the probabilistic model to feature vectors associated with document image fragments in the Document Image Database 142 to generate classifications scores for the feature vectors. In a one embodiment, the Feature Classification Module 322 generates joint probability values as classification scores for feature vectors associated with document image fragments based on a language model stored in the Writing System Corpus 144.

The Score Aggregation Module 342 determines a set of combined classification scores that indicate the likelihood that a document is written using a set of writing systems. The Score Aggregation Module 342 combines the classification scores for all the document images fragments of a document to generate a set of combined classification scores which indicate the likelihood that a document is written using each of a set of writing systems. The Score Aggregation Module 342 stores the scores in the Document Image Database 142.

The Optical Character Recognition Module 352 generates computer-readable text from the document image. The Optical Character Recognition Module is adapted to select one or more writing system dictionaries 358. The Optical Character Recognition Module 352 selects a writing system dictionary 358 based on the score of the set of scores which indicates the probability that a document is writing in the set of writing systems. The Optical Character Recognition Module 352 uses the selected writing system dictionary 358 to perform optical character recognition on the document image to generate computer-readable text. In alternate embodiments, the Optical Character Module 352 may be implemented as a standalone engine or module that is adapted to communicate with the Writing System Recognition Engine 130 to select writing system dictionaries 358 and perform optical character recognition on document images.

Figure 4:
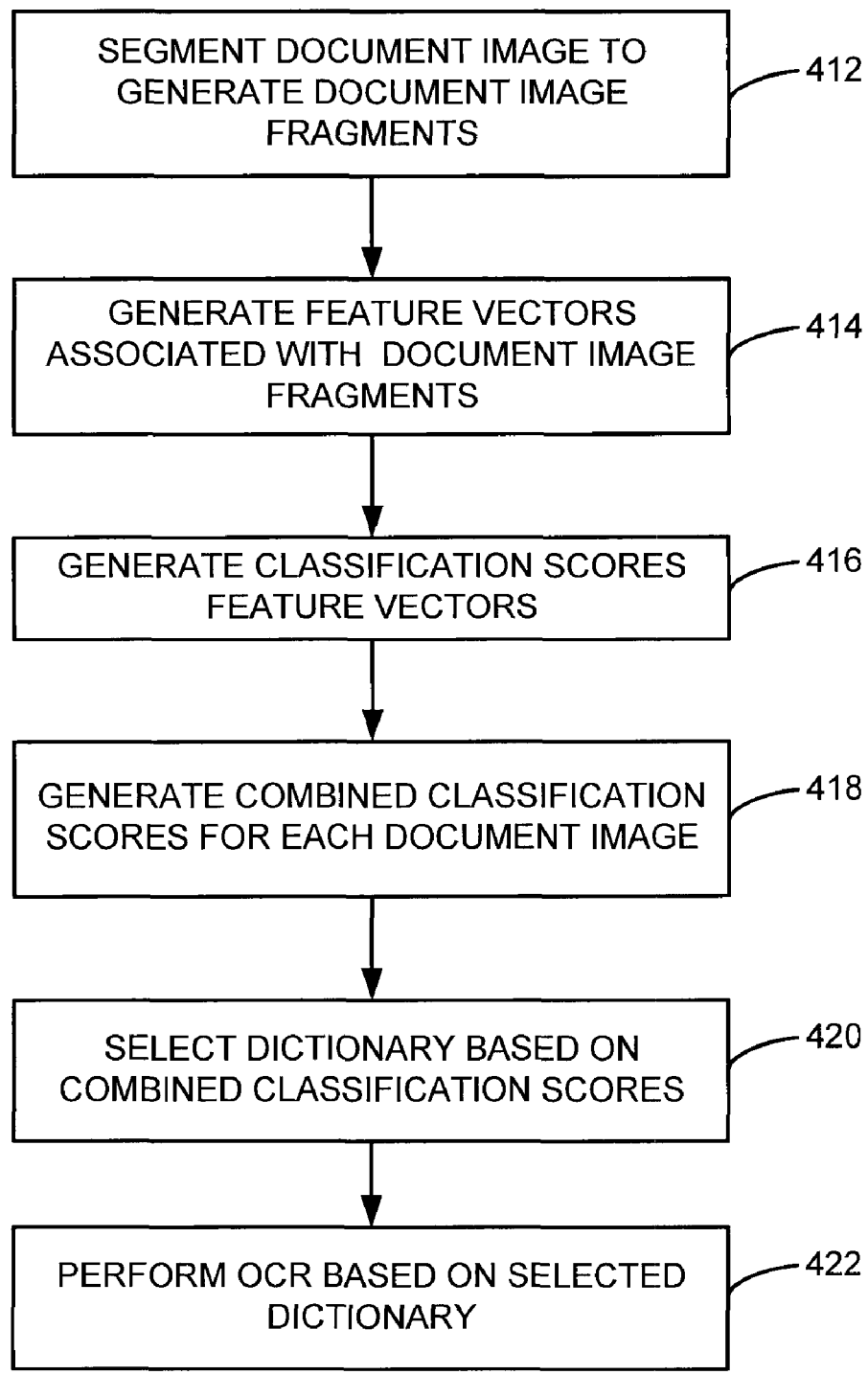
FIG. 4 is a flowchart illustrating a detailed view of steps performed by an embodiment of the Writing System Recognition Engine 130 according to one embodiment.

FIG. 4 is a flowchart illustrating a more detailed view of steps performed by an embodiment of the Writing System Recognition Engine 130 in identifying a writing system associated with a document image and performing optical character recognition based on the identified writing system.

Initially, the Segmentation Module 302 identifies 412 a set of document image fragments corresponding to words based on one or more document images associated with documents in the Document Image Database 142 and Writing System Corpus 144. The Segmentation Module 302 identifies 412 document image fragments using image segmentation techniques that identify image fragments corresponding to words. Suitable techniques include clustering of bounding box projections or the use of the recursive morphological closing transform. The Segmentation Module 302 also identifies 412 the document image fragments using probabilistic methods of document image segmentation such as pattern recognition and/or Bayesian methods. Additional methods of identifying document image fragments corresponding to words will be well known to those skilled in the art of document image processing in light of this disclosure.

The Segmentation Module 302 stores the identified document image fragments in the Document Image Database 142 and Writing System Corpus 144. The Segmentation Module 302 further stores performance data from segmentation such as: regularity in size and shape of the resulting segments; the amount of noise in the image; the locations and widths of the modes in the size histograms of connected components as a function of the morphological operations used in the segmentation; the intensity variation of the pixels within and between the found segments; and the posterior probability scores when Bayesian methods are used. In some embodiments, the Segmentation Module 302 stores co-ordinate information specifying the location of the document image fragments relative to the document image(s).

The Feature Extraction Module 312 generates 414 features vectors containing sets of sequential features for document image fragments. According to the embodiment, the Feature Extraction Module 312 may generate 414 feature vectors for all of the document image fragments or a subset of document image fragments specified by selecting a sub-image of the document image(s). In embodiments where feature vectors are generated 414 for a subset of document image fragments, the subset of document image fragments are identified based on the co-ordinates of the document image fragments and the co-ordinates of the selected sub-image.

The sequentially ordered features contained in the feature vectors represent ordered one dimensional graphic information derived from the pixels which make up the document image fragment. Ordered one dimensional graphic information is used to capture latent structure used to identify the writing system the document image fragment is written in. The Feature Extraction Module 312 generates 414 features vectors containing sequential one dimensional graphic information using various different methods. These methods are discussed in detail below with respect to FIGS. 5 and 6.

The Feature Classifier Module 332 generates 416 a set of classification scores for each feature vector based on a corpus of a feature vectors similarity generated from document images associated with known writing systems. The classification scores indicate the likelihood that the feature score is written in each of the writing systems included in the corpus. In one embodiment, the Feature Classification Module 332 generates 416 a set of classification scores which represent a probability distribution indicating the probability that the feature vector is written in each writing system represented in the corpus of feature vectors associated with known writing systems. In some embodiments, the Feature Classification Module 332 generates a reliability score in addition to the set of classification scores. The Feature Classification Module 332 stores the classification scores in the Document Image Database 142.

In one embodiment, the Feature Classification Module 332 generates 416 classification scores for the feature vectors based one or more n-grams identified in each feature vector. This embodiment is discussed in detail below with respect to FIG. 7.

In alternate embodiments, the Feature Classification Module 332 generates 416 classification scores for the feature vectors using a probabilistic model 388 trained on the corpus of feature vectors associated with known writing systems. According to the embodiment, the probabilistic model may be generated using traditional machine learning methods such as Support Vector Machines (SVMs), Neural Networks, etc. In some embodiments, the Feature Classification Module 332 generates 416 classification scores for each of the feature vectors based on other probabilistic models. In a specific embodiment, the Feature Classification Module 332 generates a Hidden Markov Model (HMM) based on the corpus of feature vectors associated with known writing systems. The Feature Classification Module 332 uses the HMM to generate 416 classification scores for each feature vector.

The Score Aggregation Module 342 generates 418 combined classification scores for each document image by combining the classification scores generated for some or all of the feature vectors. Note that herein, combining is used to represent any mathematical function performed on a set of numbers such as averaging the set of values, taking a percentile or median value of the set of values, applying a function to the set of values, etc. In some embodiments, the Score Aggregation Module 342 generates 418 the combined classification score based on weighting the classification scores according to the size of the document image fragment associated with the classification scores. In this embodiment, the weight associated with a classification score will be proportional to the size of the document image fragment. In other words, classification scores associated with larger document image fragments will be given a greater weight than classification scores associated with smaller document image fragments in generating the combined classification score.

In some embodiments, the set of classification scores are weighted based on a writing system misclassification matrix. The writing system misclassification matrix specifies a set of pair-wise penalties for misclassifying a writing system as another writing system. For instance, the pair-wise penalty for misclassifying French as Spanish may be fairly low, as the use of a dictionary which specifies Spanish in place of French may still provide functional OCR output. Conversely, a pair-wise penalty for misclassifying French as Sanskrit would be very high, as applying a dictionary which specifies Sanskrit to a document image written in French will produce nonsensical output.

In some embodiments, the Score Aggregation Module 342 generates 418 the combined classification scored based on weighting the classification scores according to the reliability score generated in association with the classification scores. Reliability scores generated based on any information which indicates the quality of the document image fragment such as performance metrics from document image segmentation and/or metrics which indicate the amount of noise in the document image fragment. Other such information which indicates the quality of the document image fragment will be apparent to those skilled in the art of document image processing. Classification scores are given a weight proportional to the reliability score in generating the combined classification scores. In some embodiments, classification scores associated with document image fragments with very low reliability scores are discarded if the Score Aggregation Module 342 stores the combined classification scores in the Document Image Database 142.

The Optical Character Recognition Module 352 selects 420 a dictionary based on combined classification scores. In one embodiment, the Optical Character Recognition Module 352 identifies the writing system associated with the lowest or highest combined classification score for the document. The Optical Character Recognition Module 352 then selects 420 the dictionary that represents the identified writing system (e.g. Kanji, Tagalog, etc.). The Optical Character Recognition Module 352 performs 422 optical character recognition on the document image to generate computer-readable text using the selected dictionary.

Figure 5:
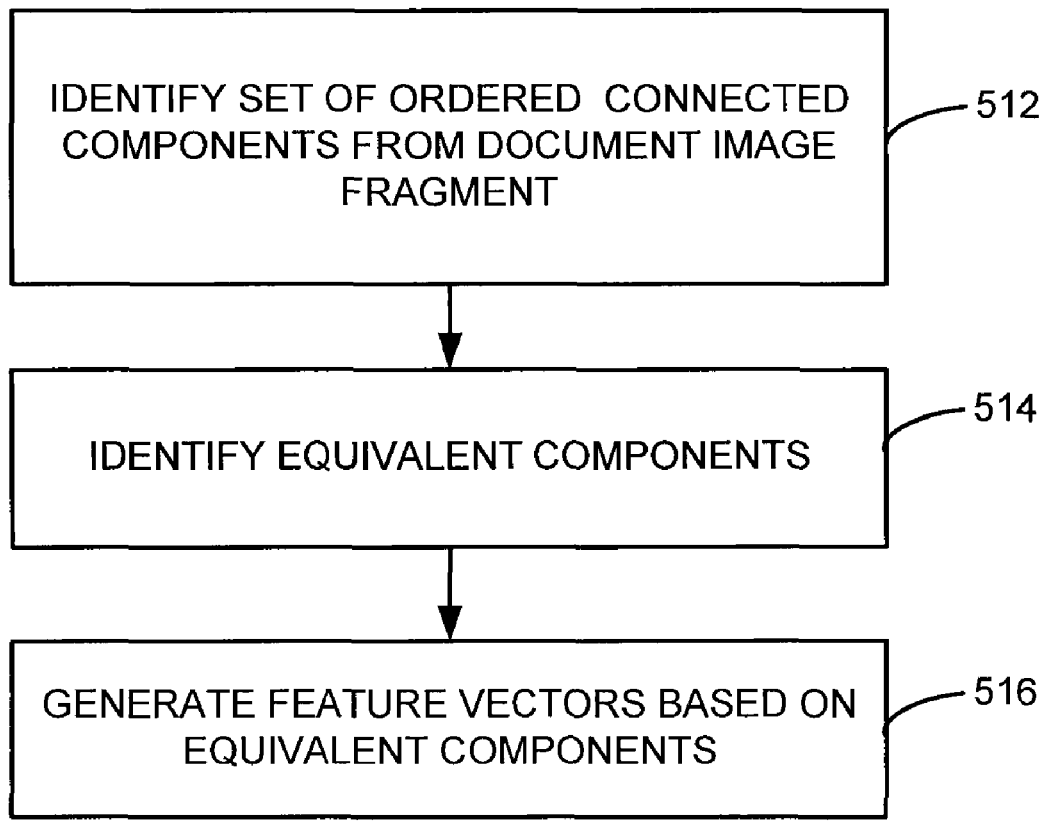
FIG. 5 is a flowchart illustrating a detailed view of steps performed by the Feature Extraction Module 312 in generating feature vectors according to one embodiment.

FIG. 5 is a flowchart illustrating a more detailed view of steps performed by the Feature Extraction Module 312 in generating feature vectors according to one embodiment.

The Feature Extraction Module 312 identifies 512 a set of ordered connected components based on each document image fragment. The Feature Extraction Module 312 scans each document image fragment in a deterministic manner (e.g. from top to bottom or left to right) to identify connected components. Connected components correspond in part to glyphs. In typology, a glyph can represent a character or any element of a writing system such as a diacritical. Connected components are defined herein as sets of pixels contiguous in the image which have similar intensity values based on a percentage of black pixels within each cell (e.g. above a given threshold pixel intensity level). At each scan, the identified set of connected components is removed from the document image fragment and placed into an ordered data structure such as a queue or a list. The scanning processes is repeated until no more connected components can be identified 512 from the document image fragment.

The Feature Extraction Module 312 identifies 514 an equivalent component for each of the ordered components in the set of ordered components. The equivalent components are indexed in association with a unique categorical variable used to represent the equivalent component. In one embodiment, the set of equivalent components is generated by determining subsets of all connected components in all writing systems (e.g. English, French, Sanskrit, etc.), wherein all pairs of components in a subset have a similarity above a given threshold similarity value, and selecting a representative equivalent component for indexing and comparison with the ordered components. In specific embodiments, these subsets are determined using methods based on clustering or centroids.

The Feature Extraction Module 312 identifies 514 an equivalent component for an ordered component based on generating a similarity value between the ordered component and each of the equivalent components. Suitable methods of determining a similarity value include but are not limited to: normalized correlation (dot product) after aligning; mean-square pixelwise error after aligning; directed and undirected Hausdorff distance, and partial directed and undirected Hausdorff distance. Additional methods of determining similarity values will be apparent to those skilled in the art in light of this disclosure. The Feature Extraction Module 312 selects the indexed equivalent component with the greatest similarity to the ordered component to represent the ordered component.

In some embodiments, both the equivalent components and set of ordered components are subject to morphological thinning prior to generating the similarity value. Additionally, morphological thinning may be performed prior to the identification of the subsets of equivalent components. Morphological thinning refers to a set of algorithms which selectively remove foreground pixels from the connected components such as erosion algorithms, opening algorithms and skeletonization algorithms. Other morphological thinning algorithms will be well known to those skilled in the art in light of this disclosure.

The Feature Extraction Module 312 generates 516 feature vectors based on the identified equivalent components. Each connected component in the set of ordered connected components is represented using the categorical variable. In a specific embodiment, the categorical variables used to represent the equivalent components are integers and the feature vectors are ordered sets of integers. In alternate embodiments, the categorical variables used to index the equivalent components are strings and the feature vectors are ordered sets of strings.

Figure 6:
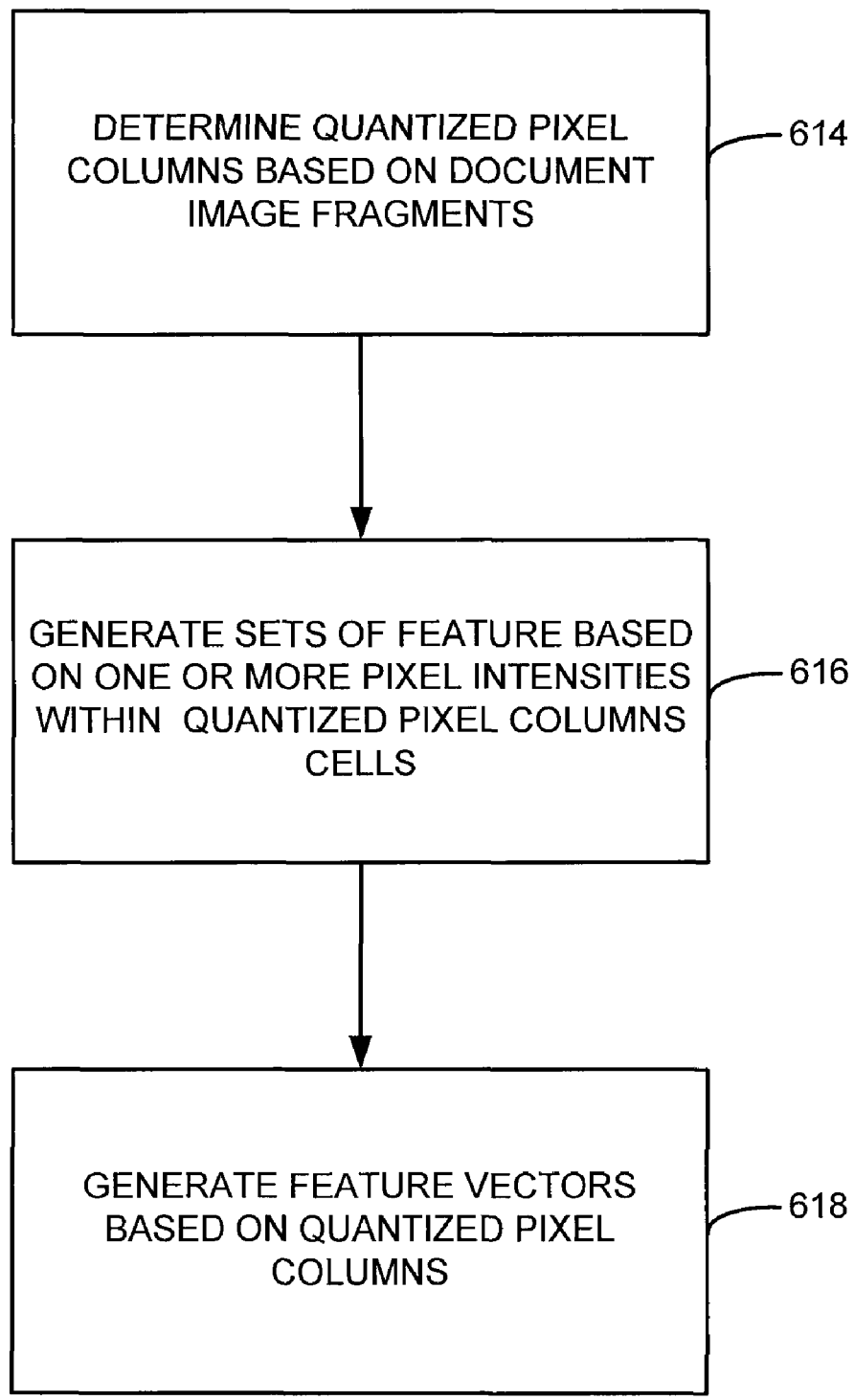
FIG. 6 is a flowchart illustrating a detailed view of steps performed by the Feature Extraction Module 312 in generating feature vectors according to another embodiment.

FIG. 6 is a flowchart illustrating a more detailed view of steps performed by the Feature Extraction Module 312 in generating feature vectors according to another embodiment.

The Feature Extraction Module 312 determines 614 a set of frames based on each document image fragment. The Feature Extraction Module 312 segregates each document image into an ordered set of frames. Each frame comprises a pixel column comprising a vertical segment of the document image fragment. According to the embodiment, the frame may be one pixel wide or several pixels wide. The height of the frame corresponds to the height of the document image fragment. The Feature Extraction Module then divides each frame into a set of equal cells. According to the embodiment, the cells may be overlapping or disjoint.

The Feature Extraction Module 312 generates 616 a set of features for each frame based on the pixel intensity. Features based on the intensity of cells within the frame include vertical and horizontal derivatives of intensity or local slope and correlation between adjacent cells. Additional features based on the intensity of the cells will be apparent to those skilled in the art in light of this disclosure.

The Feature Extraction Module 312 generates 618 feature vectors based on the features generated for the frames. The order of the features generated for the frames in the feature vector corresponds to the order the frames in the document image fragment.

Figure 7:
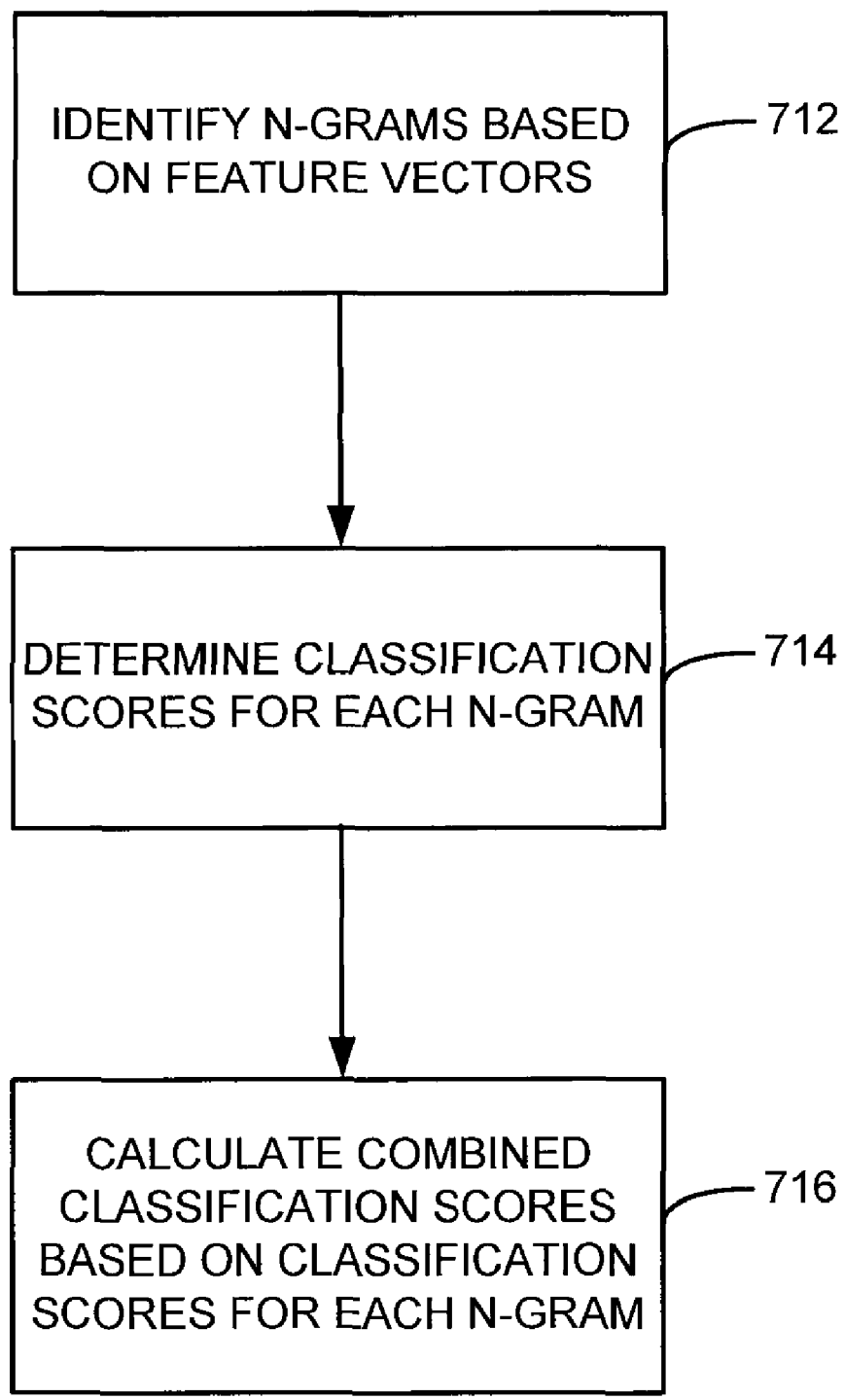
FIG. 7 is a flowchart illustrating a detailed view of steps performed by the Feature Classification Module 332 according to one embodiment.

FIG. 7 is a flowchart illustrating a more detailed view of steps performed by the Feature Classification Module 332 in generating probability values which specify the likelihood that the document image fragment is associated with a writing system according to one embodiment.

The Feature Classification Module 332 first identifies 712 a set of n-grams based on feature vectors associated with a document image fragment. Each n-gram is comprised of a sequential set of n features extracted from the ordered set of features in the feature vector. According to the embodiment, n may be any number greater than 1 and less than the number of features in the feature vector. In one embodiment, n ranges from 1-7 with the majority of n-grams having 7 features and n-grams extracted from the beginning or end of the set of ordered features having less than 7 elements. According to the embodiment, the set of n-grams may be disjoint or overlapping. In one embodiment, a set of overlapping n-grams is determined using a sliding window technique wherein each n-gram differs from another n-gram by one feature.

The Feature Classification Module 332 then generates a set of n-gram probability values based on the set of n-grams and the corpus of feature vectors which are used as classification scores. The n-gram probability values indicate the likelihood that each n-gram of features corresponds to a writing system. In one embodiment, the Feature Classification Module 332 generates a set of conditional probabilities for each of the n-grams based on a language model derived from the corpus of feature vectors associated with known writing systems. The language model specifies the likelihood that an n-gram is representative of a writing system. In one embodiment, these likelihoods are generated simply by enumerating the frequency of occurrence of each n-gram in feature vectors associated with each writing system. In one embodiment, the language model, represents the likelihood of each n-gram in feature vector based on observations of the n-gram in conjunction with the preceding n-grams in the feature vector. In a specific embodiment, this language model is generated using "smoothing", a technique used to better estimate the probabilities when insufficient information exists to generate an accurate probability value. Suitable smoothing techniques include additive smoothing, Good-Turing estimate, Jelinek-Mercer smoothing, Witten-Bell smoothing, absolute discounting and Katz smoothing. Additional smoothing methods will be apparent to those skilled in the art.

The Feature Classification Module 332 generates a set of combined classification scores for each document image fragment by generating a set of joint probability values based on the set of conditional probabilities. The joint probability values indicate the probability that the feature vector (and the document image fragment it represents) are written in a writing system. The joint probability score is calculated, for example, by multiplying the set of conditional probabilities.

In some embodiments the joint probability scores are weighted based on the frequency of occurrence of the writing systems within the Writing System Corpus 144. For example, the frequency of occurrence of the writing system may be calculated based on the number of feature vectors associated with the writing system or the number of document images associated with the writing system in the Writing System Corpus 144.

The Feature Classification Module 332 generates classification scores based on the set of feature vector probability values representing document image fragments selected from a document. Each classification score indicates the probability that a document is written using a writing system. The Feature Classification Module 332 generates classification scores by combining the feature vector probability scores.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method of identifying a writing system associated with a document image containing one or more words written in the writing system, the method comprising:
   identifying a document image fragment based on the document image, wherein the document image fragment contains one or more pixels from one or more of the words in the document image;
   generating a set of sequential features associated with the document image fragment, wherein each sequential feature describes one dimensional graphic information derived from the one or more pixels in the document image fragment;
   identifying a plurality of n-grams based on the set of sequential features, wherein each n-gram comprises an ordered subset of sequential features;

generating a classification score for the document image fragment based at least in part on a frequency of occurrence of the n-grams in sets of sequential features associated with known writing systems, the classification score indicating a likelihood that the document image fragment is written in the writing system; and identifying the writing system associated with the document image based at least in part on the classification score for the document image fragment.

2. The method of claim 1, wherein there are a plurality of writing systems, a set of classification scores indicating likelihoods that the document image fragment is associated with ones of the plurality of writing systems is generated, and the writing system associated with the document image is identified based at least in part on the set of classification scores.

3. The method of claim 1, further comprising:
selecting a writing system dictionary based on the writing system associated with the document image; and
performing optical character recognition on the document image based on the writing system dictionary.

4. The method of claim 1, further comprising:
identifying a plurality of document image fragments based on a plurality of documents;
generating a plurality of sets of sequential features associated with the plurality of document image fragments;
generating a plurality of sets of classification scores for the plurality of document image fragments responsive at least in part to the sets of sequential features;
generating a set of combined classification scores wherein each combined classification score is based on a set of classification scores indicating the likelihood that the plurality of document image fragments are written in a writing system of the set of writing systems; and
identifying a first writing system associated with the plurality of document images based on the set of combined classification scores.

5. The method of claim 4, further comprising:
associating a reliability score with each document image fragment, wherein the reliability score indicates a quality of the document image fragment; and
generating the set of combined classification scores based on weighting the plurality of sets of classification scores for each document image fragment by the reliability score associated with the document image fragment.

6. The method of claim 4, further comprising:
generating a plurality of pair-wise penalty values based on the set of writing systems, wherein each pair-wise value indicates a penalty for misclassifying a second writing system of the set of writing systems as a third writing system of the set of writing systems; and
weighting the plurality of combined classification scores for each document image fragment based on the plurality of pair-wise penalty values.

7. The method of claim 1, wherein generating a set of sequential features further comprises:
determining a plurality of sets of ordered connected components based on the document image fragment, wherein each connected component comprises a set of pixels corresponding to a glyph in the document image fragment;
determining, for each connected component, a set of similarity values between the connected component and a set of equivalent connected components, wherein each equivalent component represents at least a first glyph and is associated with a categorical value;
associating a categorical value with each connected component based on the set of similarity values; and generating the set of sequential features, wherein each sequential feature comprises the categorical value associated with an ordered connected component.

8. The method of claim 7, wherein determining, for each connected component, a set of similarity values between the connected component and a set of equivalent connected components comprises:
modifying the connected component by removing one or more pixels above a specified intensity value from the set of pixels using a morphological thinning algorithm.

9. The method of claim 1, further comprising:
identifying a set of ordered pixel columns based on the document image fragment wherein each ordered pixel column is comprised of a set of cells and each cell comprises a set of pixels;
determining a set of values for each ordered pixel column in the set, wherein each value is based on one or more intensity values of one or more pixels of the set of pixels in one or more cells of the set of cells; and generating the set of sequential features comprising the set of values.

10. The method of claim 1, further comprising:
generating a plurality of conditional probability values associated with the plurality of n-grams, wherein each conditional probability value is based at least in part on a frequency of occurrence of an n-gram in the plurality of sets of sequential features associated with known writing systems; and
generating the classification score based on the plurality of conditional probability values.

11. A non-transitory computer-readable storage medium encoded with executable computer program code for identifying a writing system associated with a document image containing one or more words written in the writing system, the program code comprising:
program code for identifying a document image fragment based on the document image, wherein the document image fragment contains one or more pixels from one or more of the words in the document image;
program code for generating a set of sequential features associated with the document image fragment, wherein each sequential feature describes one dimensional graphic information derived from the one or more pixels in the document image fragment;
program code for identifying a plurality of n-grams based on the set of sequential features, wherein each n-gram comprises an ordered subset of sequential features;
program code for generating a classification score for the document image fragment based at least in part on a frequency of occurrence of the n-grams in sets of sequential features associated with known writing systems, the classification score indicating a likelihood that the document image fragment is written in the writing system; and
program code for identifying the writing system associated with the document image based at least in part on the classification score for the document image fragment.

12. The medium of claim 11, wherein there are a plurality of writing systems, a set of classification scores indicating likelihoods that the document image fragment is associated with ones of the plurality of writing systems is generated, and the writing system associated with the document image is identified based at least in part on the set of classification scores.

13. The medium of claim 11, further comprising:
program code for selecting a writing system dictionary based on the writing system associated with the document image; and program code for performing optical character recognition on the document image based on the writing system dictionary.

14. The medium of claim 11, further comprising:
program code for identifying a plurality of document image fragments based on a plurality of documents;
program code for generating a plurality of sets of sequential features associated with the plurality of document image fragments;
program code for generating a plurality of sets of classification scores for the plurality of document image fragments responsive at least in part to the sets of sequential features;
program code for generating a set of combined classification scores wherein each combined classification score is based on a set of classification scores indicating the likelihood that the plurality of document image fragments are written in a writing system of the set of writing systems; and
program code for identifying a first writing system associated with the plurality of document images based on the set of combined classification scores.

15. The medium of claim 14, further comprising:
program code for associating a reliability score with each document image fragment, wherein the reliability score indicates a quality of the document image fragment; and
program code for generating the set of combined classification scores based on weighting the plurality of sets of classification scores for each document image fragment by the reliability score associated with the document image fragment.

16. The medium of claim 14, further comprising:
program code for generating a plurality of pair-wise penalty values based on the set of writing systems, wherein each pair-wise value indicates a penalty for misclassifying a second writing system of the set of writing systems as a third writing system of the set of writing systems; and
program code for weighting the plurality of combined classification scores for each document image fragment based on the plurality of pair-wise penalty values.

17. The medium of claim 11, wherein program code for generating a set of sequential features further comprises:
program code for determining a plurality of sets of ordered connected components based on the document image fragment, wherein each connected component comprises a set of pixels corresponding to a glyph in the document image fragment;
program code for determining, for each connected component, a set of similarity values between the connected component and a set of equivalent connected components, wherein each equivalent component represents at least a first glyph and is associated with a categorical value;
program code for associating a categorical value with each connected component based on the set of similarity values; and
program code for generating the set of sequential features, wherein each sequential feature comprises the categorical value associated with an ordered connected component.

18. The medium of claim 17, wherein program code for determining, for each connected component, a set of similarity values between the connected component and a set of equivalent connected components comprises:

program code for modifying the connected component by removing one or more pixels above a specified intensity value from the set of pixels using a morphological thinning algorithm.

19. The medium of claim 11, further comprising:
program code for identifying a set of ordered pixel columns based on the document image fragment wherein each ordered pixel column is comprised of a set of cells and each cell comprises a set of pixels;
program code for determining a set of values for each ordered pixel column in the set, wherein each value is based on one or more intensity values of one or more pixels of the set of pixels in one or more cells of the set of cells; and
program code for generating the set of sequential features comprising the set of values.

20. The medium of claim 11, further comprising:
program code for generating a plurality of conditional probability values associated with the plurality of n-grams, wherein each conditional probability value is based at least in part on a frequency of occurrence of an n-gram in the plurality of sets of sequential features associated with known writing systems; and
program code for generating the classification score based on the plurality of conditional probability values.

21. A computer system for identifying a writing system associated with a document image containing one or more words written in the writing system, the system comprising:
a non-transitory computer-readable storage medium encoded with executable computer program code comprising:
a segmentation module adapted to identify a document image fragment based on the document image, wherein the document image fragment contains one or more pixels from one or more of the words in the document image;
a feature extraction module adapted to generate a set of sequential features associated with the document image fragment, wherein each sequential feature describes one dimensional graphic information derived from the one or more pixels in the document image fragment;
a feature classification module adapted to:
identify a plurality of n-grams based on the set of sequential features, wherein each n-gram comprises an ordered subset of sequential features; and
generate a classification score for the document image based at least in part on a frequency of occurrence of the n-grams in sets of sequential features associated with known writing systems, the classification score indicating a likelihood that the document image fragment is written in the writing system; and
an optical character recognition module adapted to identify the writing system associated with the document image based at least in part on the classification score for the document image fragment; and
a processor for executing the computer program code.

22. The system of claim 21, wherein the optical character recognition module is further adapted to:
select a writing system dictionary based on the writing system associated with the document image; and
perform optical character recognition on the document image based on the writing system dictionary.

23. The system of claim 21, wherein the feature extraction module is further adapted to:
- determine, for each of a plurality of connected components of the document image fragment, a set of similarity values between the connected component and a set of equivalent connected components, wherein each equivalent component represents at least a first glyph and is associated with a categorical value;
- associate a categorical value with each connected component based on the set of similarity values; and
- generate the set of sequential features, wherein each sequential feature comprises the categorical value associated with an ordered connected component.

24. The system of claim 21, wherein the feature extraction module is further adapted to:
- identify a set of ordered pixel columns based on the document image fragment wherein each ordered pixel column is comprised of a set of cells and each cell comprises a set of pixels;
- determine a set of values for each ordered pixel column in the set, wherein each value is based on one or more intensity values of one or more pixels of the set of pixels in one or more cells of the set of cells; and
- generate the set of sequential features comprising the set of values.

25. The system of claim 21, wherein the feature classification module is further adapted to:
- generate a plurality of conditional probability values associated with the plurality of n-grams, wherein each conditional probability value is based at least in part on a frequency of occurrence of an n-gram in the plurality of sets of sequential features associated with known writing systems; and
- generate the classification score based on the plurality of conditional probability values.

26. The method of claim 1, wherein at least some of the n-grams in the plurality include overlapping ones of the sequential features.

27. The method of claim 1, wherein identification of the plurality of n-grams includes generating the plurality of n-grams according to a sliding window scheme, wherein each generated n-gram in the plurality differs from at least one other n-gram in the plurality by one feature.

28. The method of claim 10, wherein a conditional probability value for a first n-gram is determined based at least in part on observations for one or more other n-grams in the sets of sequential features associated with the known writing systems, wherein the one or more other n-grams precede the first n-gram in the plurality of n-grams.

* * * * *